(12) United States Patent
Yang

(10) Patent No.: US 11,451,030 B2
(45) Date of Patent: Sep. 20, 2022

(54) SNAP-IN CONNECTOR

(71) Applicant: CHANGZHOU YINLEI ELECTRONIC CO., LTD., Jiangsu (CN)

(72) Inventor: Jinxing Yang, La Habra, CA (US)

(73) Assignee: CHANGZHOU YINLEI ELECTRONIC CO., LTD., Jiangsu (CN)

( * ) Notice: Subject to any disclaimer, the term of this patent is extended or adjusted under 35 U.S.C. 154(b) by 0 days.

(21) Appl. No.: 17/341,707

(22) Filed: Jun. 8, 2021

(65) Prior Publication Data

US 2021/0384714 A1 Dec. 9, 2021

Related U.S. Application Data

(60) Provisional application No. 63/036,580, filed on Jun. 9, 2020.

(51) Int. Cl.
*H02G 3/08* (2006.01)
(52) U.S. Cl.
CPC ................... *H02G 3/083* (2013.01)
(58) Field of Classification Search
CPC ........ H02G 3/086; H02G 3/22; H02G 3/0468; H02G 15/06; H01B 17/583
USPC ..... 174/58, 666, 59, 60, 481, 68.1; 439/535, 439/215, 552, 557, 98, 209, 210, 211, 439/271, 110, 135, 137, 431, 462, 472, 439/544, 545, 580, 584, 1, 100, 101, 108, 439/121, 131, 134, 14, 141, 142, 164, 439/189, 191, 192, 206, 254, 273, 286, 439/298, 310, 319, 332, 334, 345, 347, 439/350, 351, 361, 364, 365, 372, 435, 439/444, 446, 460, 470, 475, 488, 491, 439/502, 505, 519, 536, 539, 572, 583, 439/640, 649, 650, 651, 676, 677, 721, 439/801, 804, 806, 812, 814, 92, 927, 95, 439/97; 285/149.1, 373, 154.4

See application file for complete search history.

(56) References Cited

U.S. PATENT DOCUMENTS

| | | | | |
|---|---|---|---|---|
| 834,684 | A * | 10/1906 | Sibley | H02G 3/0683 285/154.4 |
| 1,418,990 | A * | 6/1922 | Thomas, Jr. | H02G 3/0683 285/194 |
| 1,776,652 | A * | 9/1930 | Clayton | F16B 2/10 285/154.3 |
| 2,200,874 | A * | 5/1940 | Dann | H02G 3/0683 285/154.3 |

(Continued)

*Primary Examiner* — Krystal Robinson
(74) *Attorney, Agent, or Firm* — Gottlieb, Rackman & Reisman, P.C.

(57) ABSTRACT

A tubular snap-in connector includes one or more elastically mounted retaining tabs formed integrally with the connector. The retaining tabs permit the connector to be selectively connected to an electrical junction box by inserting a body of the connector into an appropriate opening in the junction box, advancing the body of the connector forward so that a wall of the junction box depresses a ramp portion of the retaining tabs, and continuing to advance the body of the connector forward until a wedge portion of the retaining tabs passes the wall of the junction box, at which point the retaining tabs spring outwards. A rear wall of each wedge engages an inner wall of the junction box to retain the connector within the box.

21 Claims, 16 Drawing Sheets

(56) References Cited

U.S. PATENT DOCUMENTS

| | | | | |
|---|---|---|---|---|
| 3,174,776 | A * | 3/1965 | Berger | H02G 3/0683 285/154.4 |
| 3,788,582 | A * | 1/1974 | Swanquist | H02G 3/0658 174/666 |
| 3,858,151 | A * | 12/1974 | Paskert | H01R 4/64 439/98 |
| 4,536,613 | A * | 8/1985 | Gallas | H02G 3/0691 285/137.11 |
| 5,204,499 | A * | 4/1993 | Favalora | H02G 3/0691 174/669 |
| 5,647,613 | A * | 7/1997 | Marik | H01R 13/5812 285/154.3 |
| 5,894,109 | A * | 4/1999 | Marik | H02G 3/0683 D13/152 |
| 7,048,561 | B1 * | 5/2006 | Elbaz | H02G 3/083 285/151.1 |
| 7,057,107 | B2 * | 6/2006 | Auray | H02G 3/0691 439/535 |
| 7,390,980 | B1 * | 6/2008 | Gretz | H02G 3/06 174/666 |
| 8,690,194 | B1 * | 4/2014 | Smith | F16L 25/01 285/154.4 |
| 8,803,008 | B2 * | 8/2014 | Chavan | H02G 3/0616 439/210 |
| 8,901,441 | B2 * | 12/2014 | Sathyanarayana | H02G 3/0691 174/655 |
| 9,431,808 | B1 * | 8/2016 | Perkins | H02G 3/18 |
| 10,892,610 | B2 * | 1/2021 | Smith | H02G 3/0691 |

* cited by examiner

SNAP-IN CONNECTOR

CROSS-REFERENCE TO RELATED APPLICATION

This non-provisional patent application claims priority under 35 U.S.C. § 119 to U.S. provisional patent application No. 63/036,580, filed on Jun. 9, 2020, the disclosure of which is incorporated by reference herein in its entirety.

TECHNICAL FIELD

The present invention relates to a snap-in connector, and more particularly, to a snap-in connector for an electrical box.

DISCUSSION OF THE RELATED ART

In home and commercial electrical systems, sheathed wire cables or wires contained in conduits are typically joined to other wires inside an electrical junction box. The wire cable or conduit needs to be securely coupled to the junction box to prevent tension on the conduit or wires from being transferred to electrical connections in the junction box. The same concern exists for other types of electrical boxes, such as fixture, switch, and outlet boxes.

Various types of cable clamp connectors are available. One conventional design is a cable clamp with a threaded front portion that is inserted into the hole in the junction box and then fixed in place with a screw-on lock nut or ring that is threaded onto the clamp from inside of the box. Attaching these can be difficult when there is limited space within the box and can be somewhat time consuming, impacting efficiency when many such connections need to be made during a project, such as installing the wiring within a new building.

Various types of snap-in couplers also available. These typically include an elastic flange or tab extending outwards from the coupler and that is depressed by the wall of the junction box as the connector is inserted and then snaps outwards when the wall is passed and act to prevent the connector from being pulled out. Such conventional snap in connectors cannot be uncoupled from the outside of the junction box once coupled to it. Instead, access to the interior of the box is required to depress the locking tabs and reaching the tabs may be difficult when the inside of the box is crowded and/or a locking tab is poorly oriented relative the box opening. This can impact efficiency and labor costs associated with wiring installation and repair. The locking tabs are also formed on a ring or sleeve that is fitted over the main body of the coupler and adding this additional component increases manufacturing cost and complexity.

Accordingly, there is a need for an improved snap-in connector that can easily and securely be coupled to an electrical or other box and which can be easily removed from the box without requiring access to the box interior. There is a further need for such a connector in which the snap-in mechanism can be integrally formed with the body of the coupler.

SUMMARY

These and other needs are met by a tubular snap-in connector having one or more elastically mounted retaining tabs formed integrally with the connector and that permit the connector to be selectively connected to an electrical junction box or similar box by inserting the body of the connector into an appropriate opening in the junction box, advancing it forward so that the wall of the box depresses a ramp portions of the retaining tabs and continuing to advance until the wedge portions pass the wall and the retaining tabs spring outwards A rear wall of each wedge engages the inner wall of the box to retain the connector within the box.

A portion of the retaining tab is accessible from outside of the box. This allows the connector to be selectively uncoupled from the junction box without requiring access to the box interior. Pressing the external tab portion inward toward a center of the tubular body, such as with a flat head screwdriver, lowers the ramp until its does not engage the wall of the box allowing the connector to be pulled backwards and removed.

A retaining tab can also have a flange (or lip) extending from behind the base radially outward and configured to make contact with the exterior wall of the junction box when inserting the snap-in connector into the box and thereby limit the insertion depth of the snap-in connector. The flange can extend circumferentially in an arc beyond the area of the wedge portion of the tab providing a larger area which can be depressed in a connector removal process. Such a flange provides a larger area that can be pressed to lower the retaining tab, simplifying this action.

In an embodiment, a snap-in connector can also have one or more alignment flanges (or protrusions) extending outward from the outer surface of the tubular body. The alignment flanges help keep the connector aligned with the junction box during insertion and can frictionally engage the connector with the junction box and reduce unwanted rotation of the coupler relative to the junction box.

BRIEF DESCRIPTION OF THE DRAWINGS

The above and other features of the present invention will become more apparent by describing in detail exemplary embodiments thereof in conjunction with the accompanying drawings, in which.

DETAILED DESCRIPTION

Figure 1:
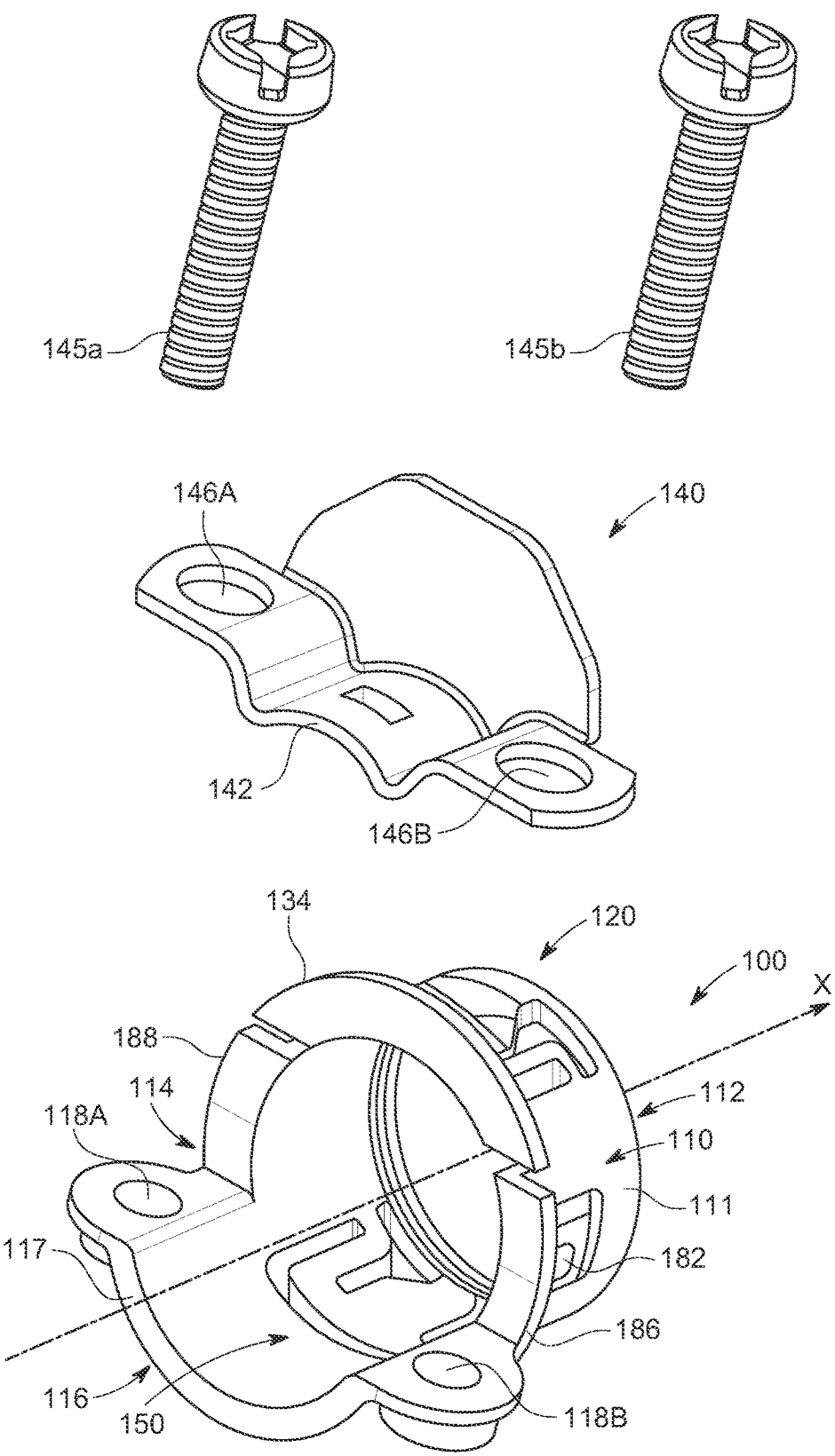
FIG. 1 is an exploded perspective view illustrating a snap-in connector assembly according to an exemplary embodiment of the present invention.

Exemplary embodiments of the connector will be described more fully hereinafter with reference to the accompanying drawings. The present invention may, however, be embodied in different forms and should not be construed as being limited to the embodiments set forth herein. Like reference numerals may refer to like elements throughout the specification. The sizes and/or proportions of the elements illustrated in the drawings may be exaggerated for clarity. In addition, the dimensions illustrated in the drawings are merely exemplary. The scope of the present invention is not limited thereto.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

FIGS. 1-12 illustrate a snap-in connector assembly 100 according to an exemplary embodiment configured to be connected to an aperture in the wall of a junction or similar box.

Referring to FIGS. 1-12, assembly 100 comprises a tubular connector body 110, which can be cylindrical, and has a central axis X, an open front end 112 which is insertable into an aperture in a junction box 170, an open back end 114 which remains outside the junction box when the connector is coupled thereto, and a side wall with an outer surface 111 extending between the first and second ends 112 and 114. One or more retaining tabs, such as a first retaining tab 120 (see FIG. 1), a second retaining tab 150 (see FIGS. 3 and 7A), are formed in the body 110 and are described further below. One or more radially extending rear flanges, such as rear flanges 186 and 188 (e.g., FIG. 8) can be provided axially back from the retaining tabs, such as at or near the back 114 of the body 110 and which can operate to limit the depth to which the connector can be inserted into the junction box. Depth limiting flanges can also be formed as part of a retaining tab as discussed further below. One or more alignment flanges, such as flanges 182 and 184 (e.g., FIGS. 1 and 5) can also be provided to help align the connector during the insertion process and to frictionally engage the junction box wall help reduce unwanted rotation of the connector.

A clamping mechanism 140 can be integrally formed or attached, at least in part, to the back 114 of the body 110. In FIG. 1, clamping mechanism 140 comprises a clamping surface 116 that extends axially backwards from the body 110 and to which a compression plate 142 can be attached, such as with screws 145a, 145b that pass through holes 146a, 146, and engage threaded apertures 118a, 118b. Alternative clamping mechanisms can be used, such as discussed below with respect to FIGS. 13-17.

The connector body 110 may be made of a metal, an elastomeric material, or a combination thereof. Non-limiting examples of metals suitable for constructing the connector 110 and the clamping component 140 include zinc, nickel, copper, aluminum, iron (or steel when containing carbon), etc., or alloys thereof. The elastomeric materials include, for example, polycarbonate, polyvinyl chloride, polyethylene, polystyrene, etc., or blends thereof. Other components, such as the compression plate 142, can also be made from a metal, an elastomeric material, or a combination thereof. In a particular embodiment connector body 110 and compression plate 142 are made of a zinc alloy which as desirable flexibility and elasticity characteristics, is low cost and resistant to oxidation.

Figure 3:
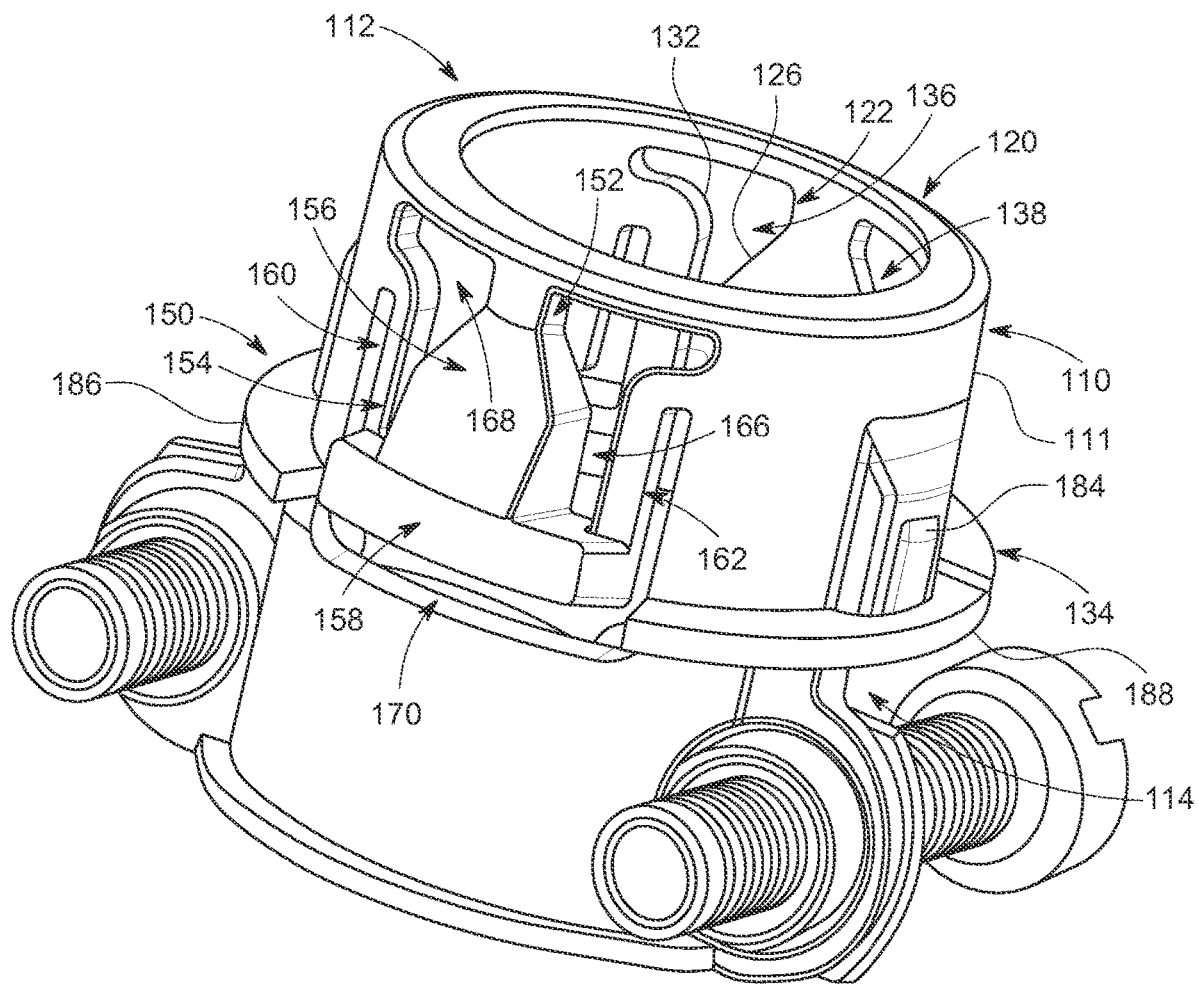
FIG. 3 is a perspective view illustrating a bottom side of the snap-in connector assembly of FIG. 1.
Figure 4:
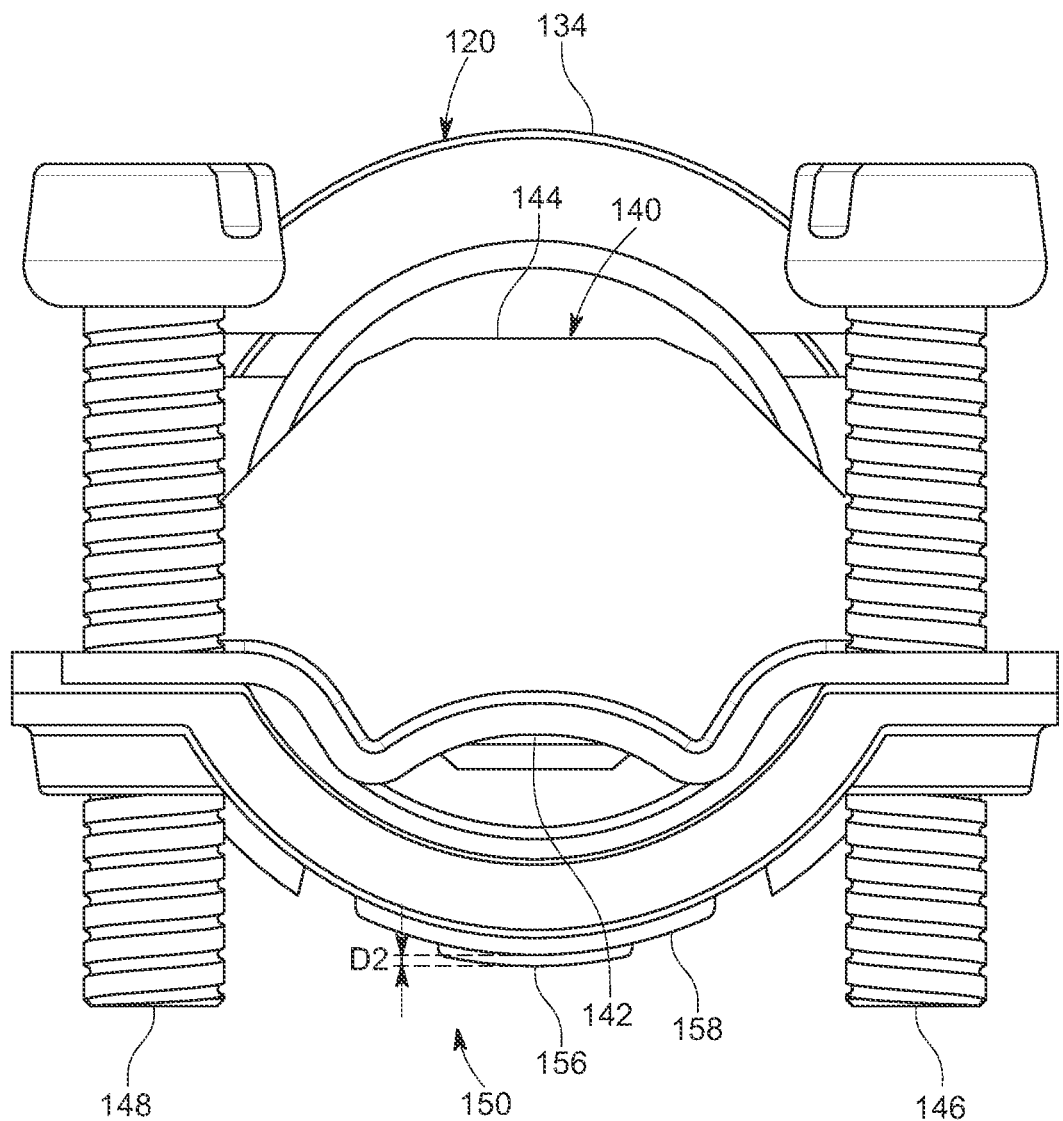
FIG. 4 is rear plan view illustrating the snap-in connector assembly of FIG. 1.
Figure 7A:
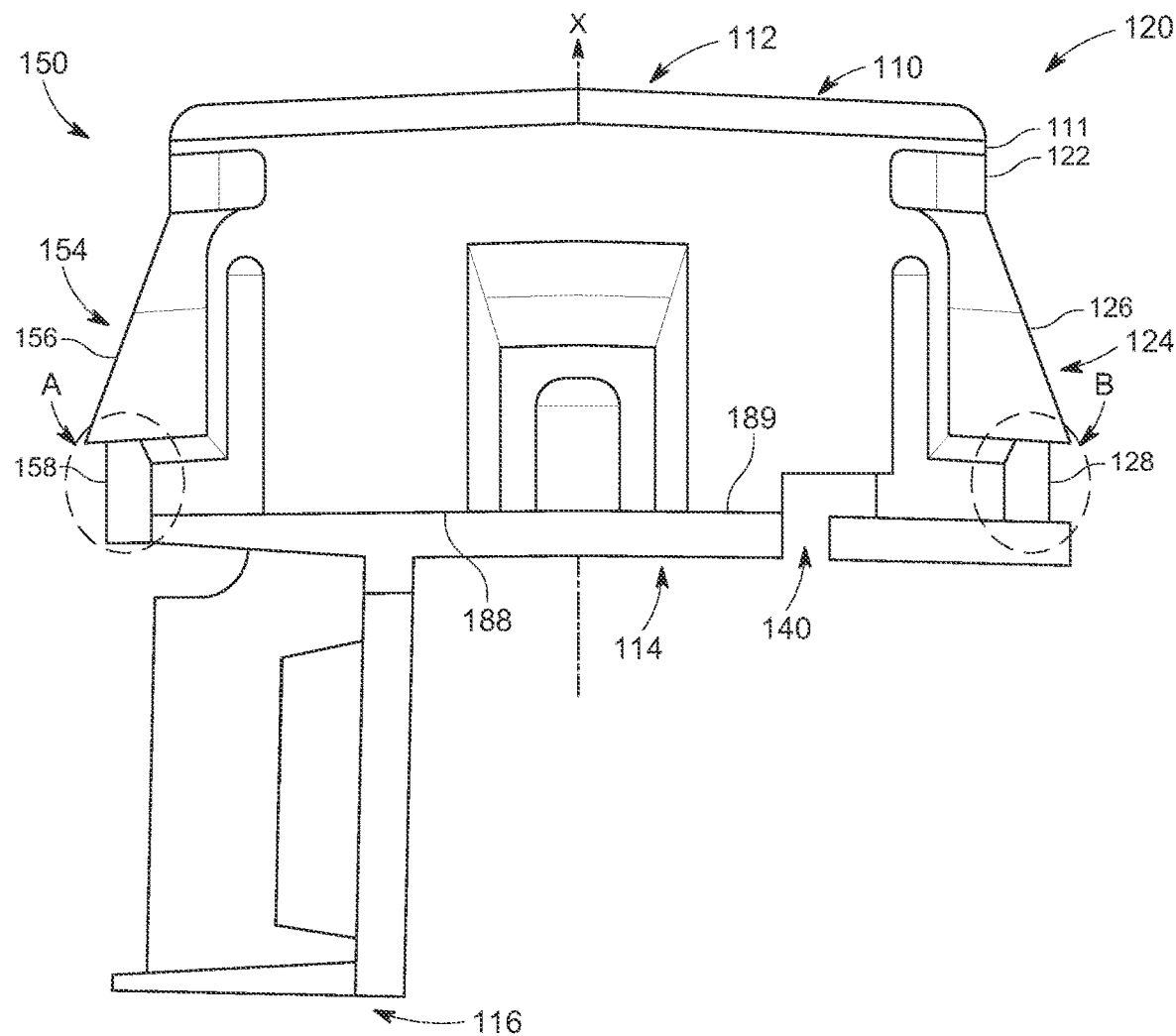
FIG. 7A is an elevational side view illustrating a snap-in connector included in the assembly of FIG. 1.
Figure 7B:
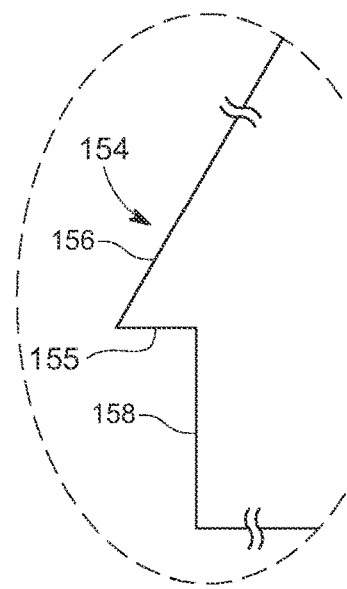
FIG. 7B is a magnified view of a region A of FIG. 7A.

As illustrated in FIGS. 1, 3 and 7A, when more than one retaining tab is provided, such as the first and second retaining tabs 120, 150, the tabs can be evenly spaced around the circumference of the body 110. Likewise, if more than one alignment flange is provided, such as alignment flanges 182 and 184, the alignment flanges can also be evenly spaced around the body 110 circumferences and, in a particular embodiment, the tabs and alignment flanges alternate around the circumference. Similarly the one or more rear flanges, such as flanges 186, 188, can be circumferentially around the back 114 of the body 110 in areas other than those associated with a retaining tab.

Figure 5:
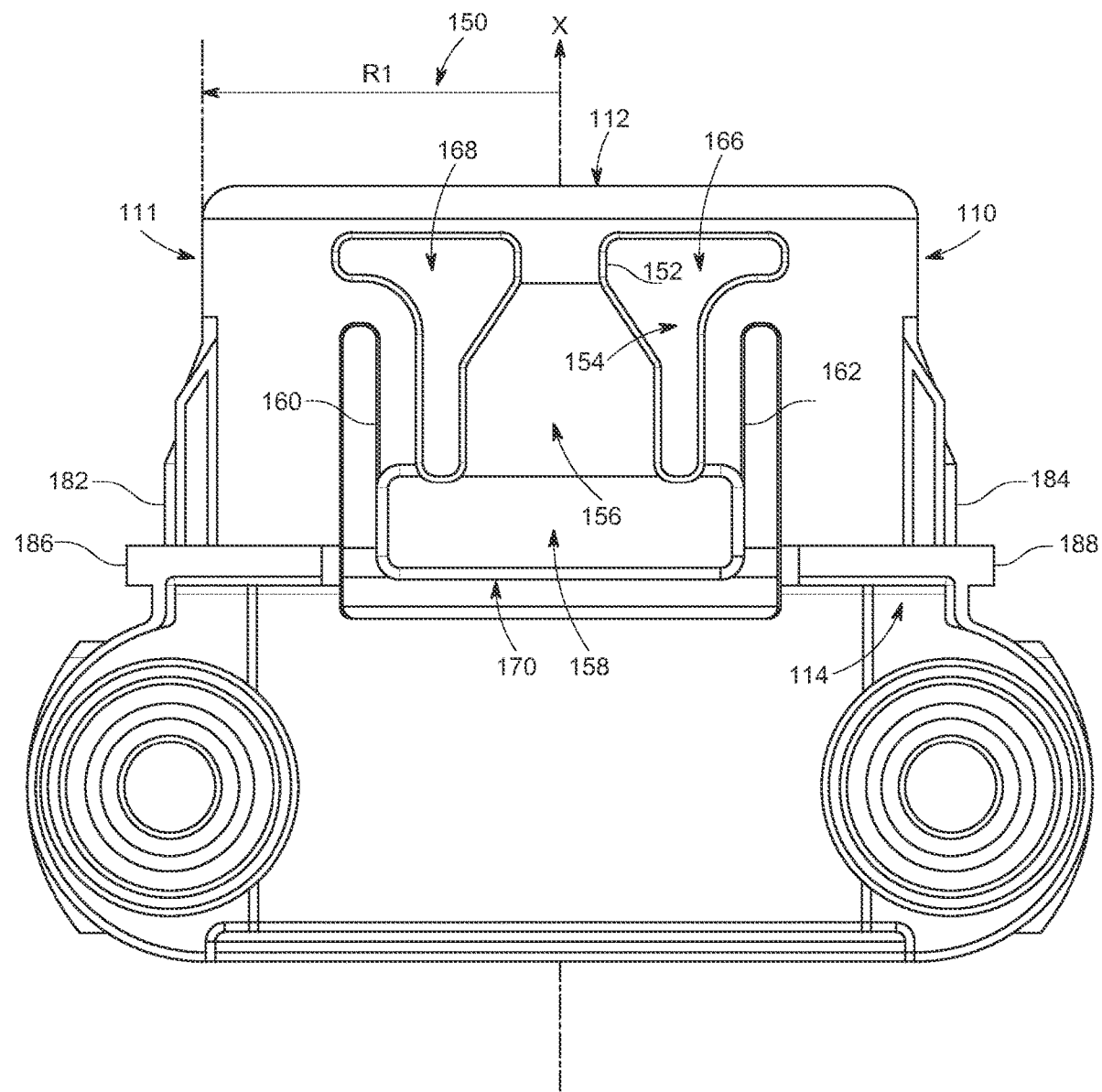
FIG. 5 is bottom plan view illustrating the snap-in connector assembly of FIG. 1.

As illustrated in FIG. 5, the body 110 may have an outer radius R1 (from the outer surface of the body 111 to the central axis X).

Whether the first and second retaining tabs 120 and 150 are made of a metal or of an elastomeric material, the first and second retaining tabs 120 and 150 are elastically connected to the body to a degree sufficient to enable them to be deflected inwardly toward the central axis X without undue force when inserting the connector 100 into an opening 172 of a junction box 170 (see FIGS. 9-12) in order to couple the connector 100 with the junction box 170. In addition, the first and second retaining tabs 120 and 150 are elastic to a degree sufficient to enable them to be deflected inwardly toward the central axis X without undue force when, for example, utilizing a screwdriver or other means to press the first and second retaining tabs 120 and 150 inwardly to uncouple the connector 100 from the outside of the junction box 170.

Figure 2:
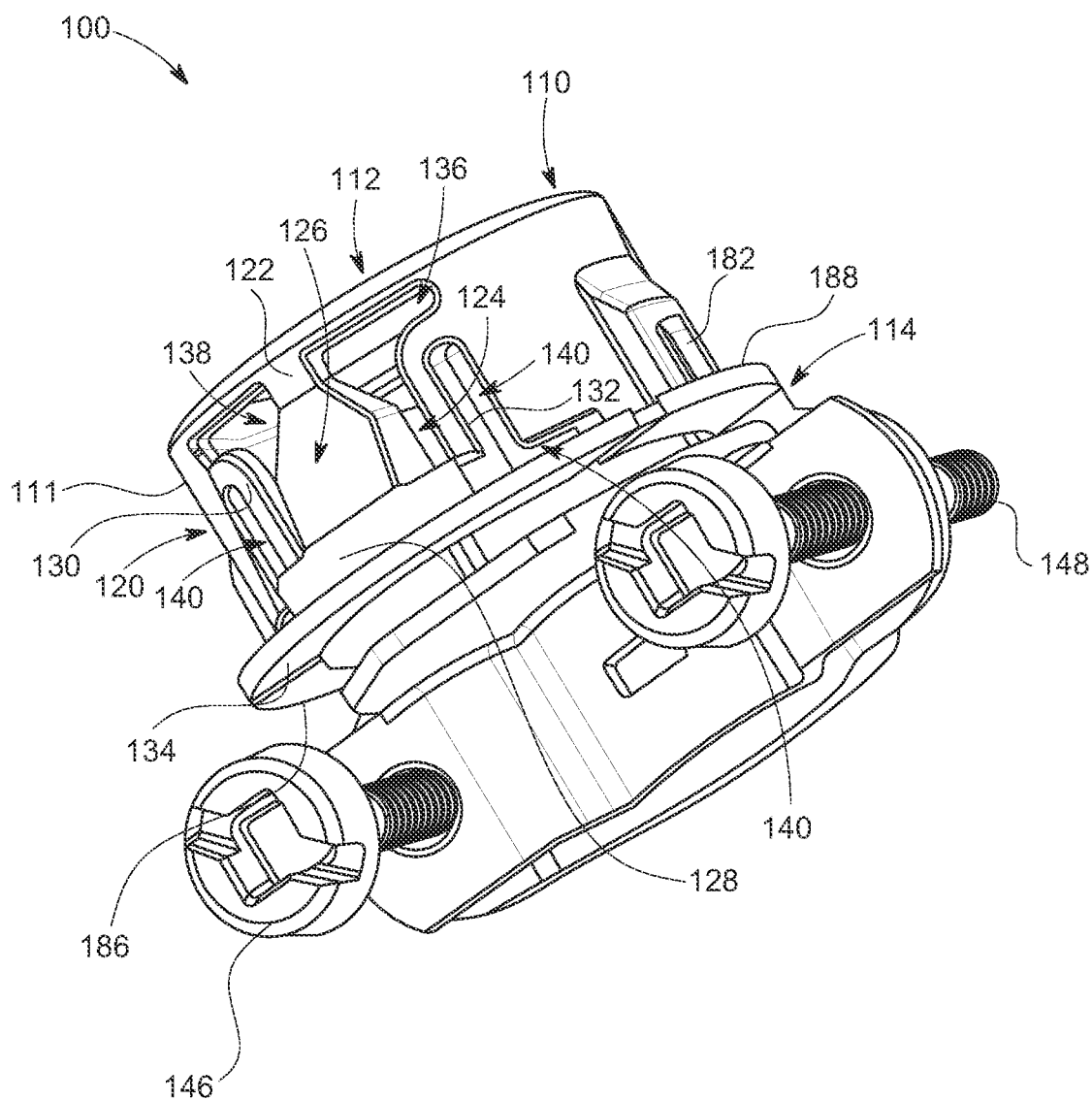
FIG. 2 is a perspective view illustrating a top side of the snap-in connector assembly of FIG. 1.
Figure 6:
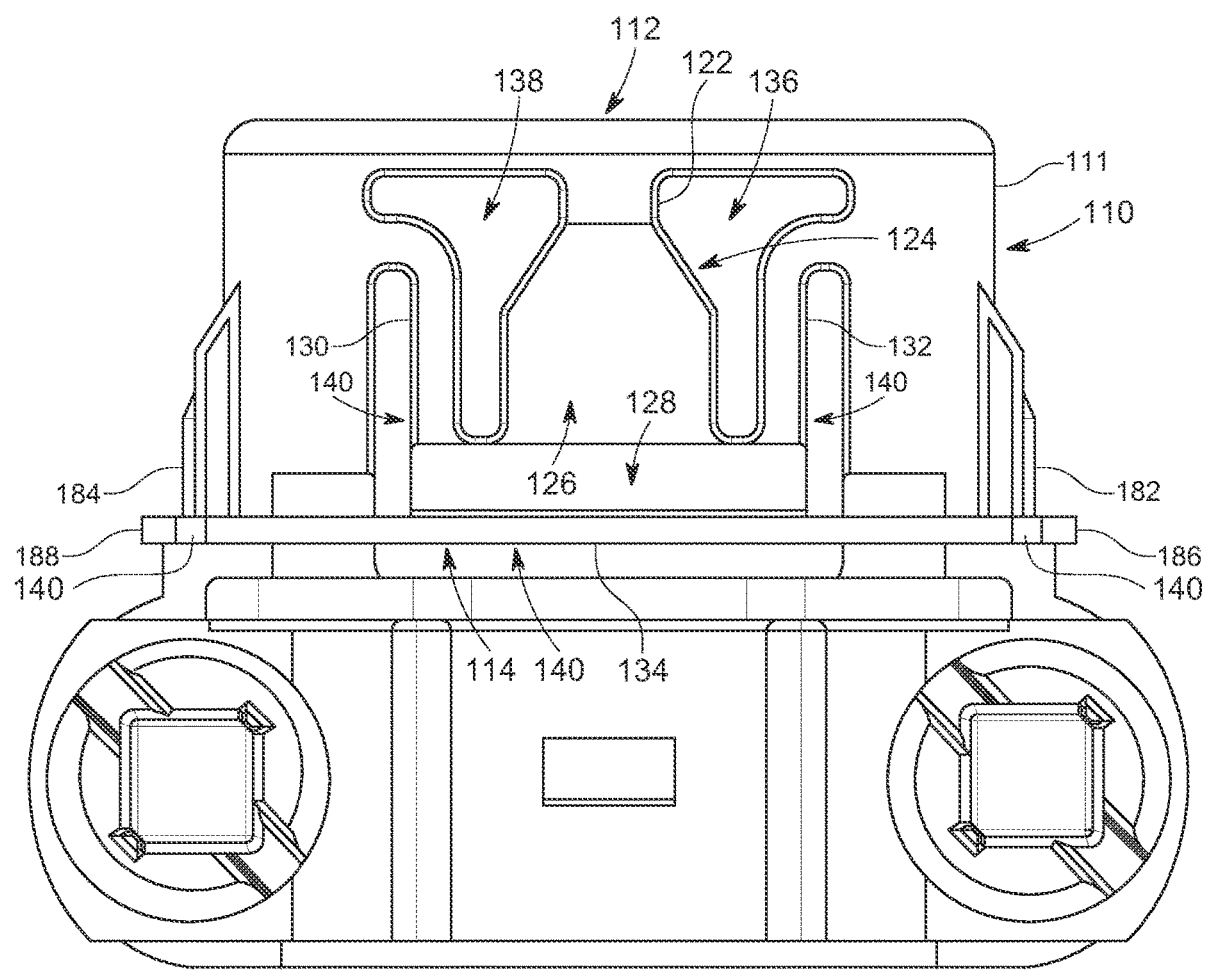
FIG. 6 is a top plan view illustrating the snap-in connector assembly of FIG. 1.

Referring to FIGS. 2 and 6, the tab 120 is formed within an opening in the outer surface 111 of the body 110. A front of the tab 120 is connected to the body 110 at a junction 122. The tab 120 extends backwards in the opening from junction 122. First and second ribs 130, 132 extend into the opening from the body 110 on opposite sides of the tab 120 and extend backwards along the sides of the tab 120 before connecting to the tab 120 at a generally rearward position. The junction 122 and ribs 130, 132 are generally narrow and provide the elastic connection of the tab 120 to the body 110.

The tab 120 includes a ramped portion 124 that starts towards a front of the tab, such as at or adjacent the junction 122. The ramped portion 124 has an outer inclined surface 126 with a height relative to the central axis X that increases towards the rear 114 of the body 110. The maximum distance between the ramped portion 124 and the central axis X is denoted by a radius R2 (see FIG. 7A).

Figure 7C:
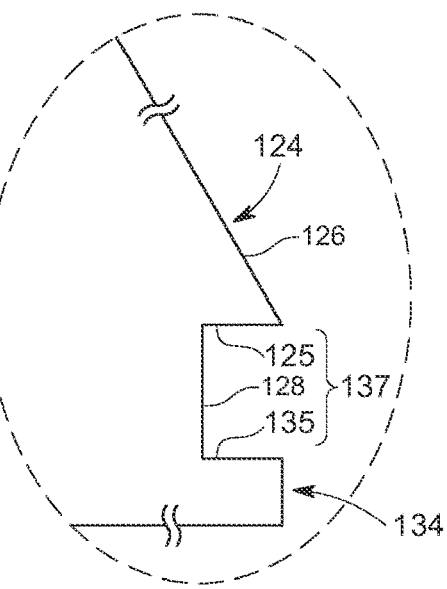
FIG. 7C is a magnified view of a region B of FIG. 7A.
Figure 8:
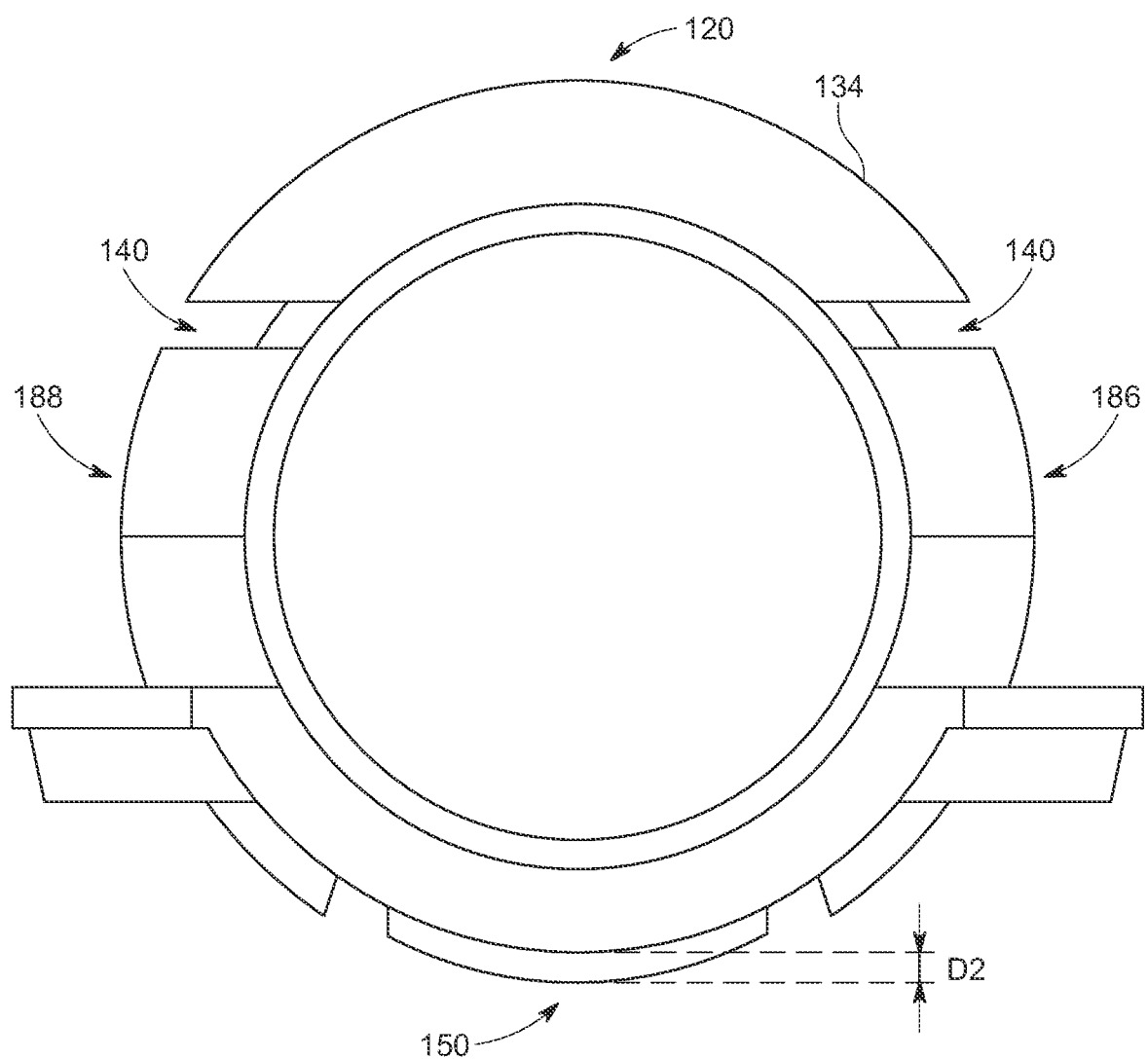
FIG. 8 is rear plan view illustrating the snap-in connector of FIG. 7.
Figure 9:
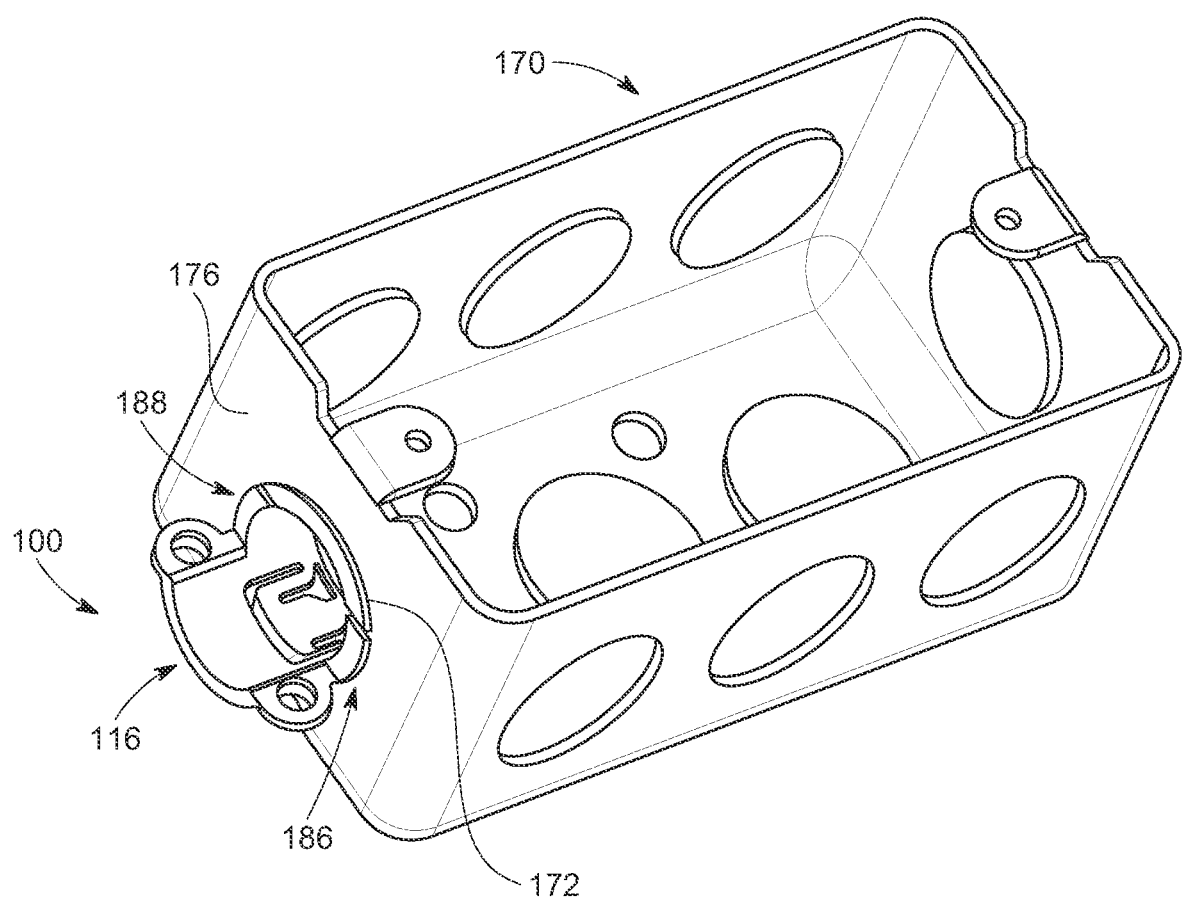
FIG. 9 is a perspective view illustrating the snap-in connector of FIG. 7 connected to a junction box.
Figure 10:
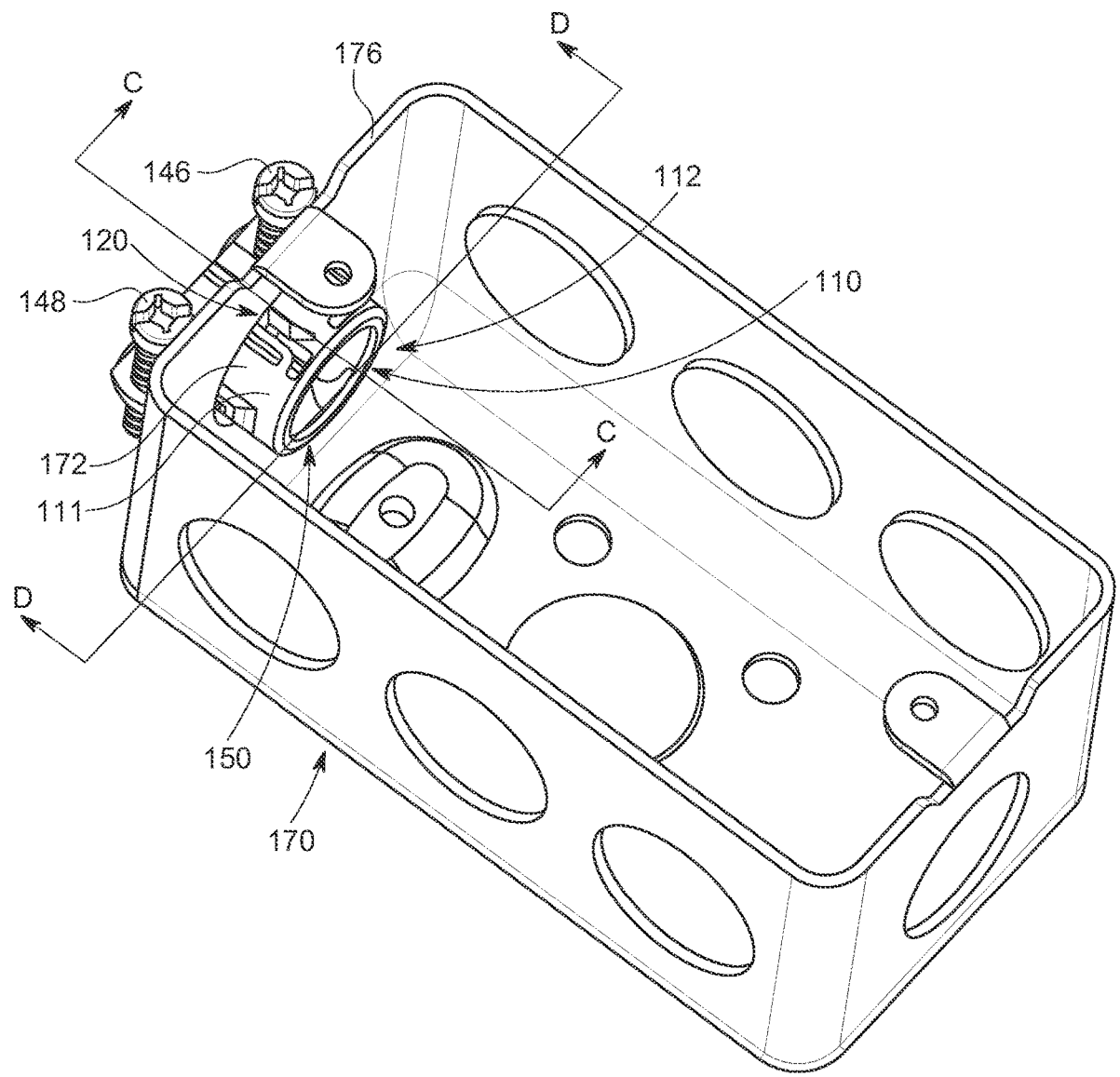
FIG. 10 is a perspective view illustrating the snap-in connector assembly of FIG. 1 connected to a junction box.
Figure 11:
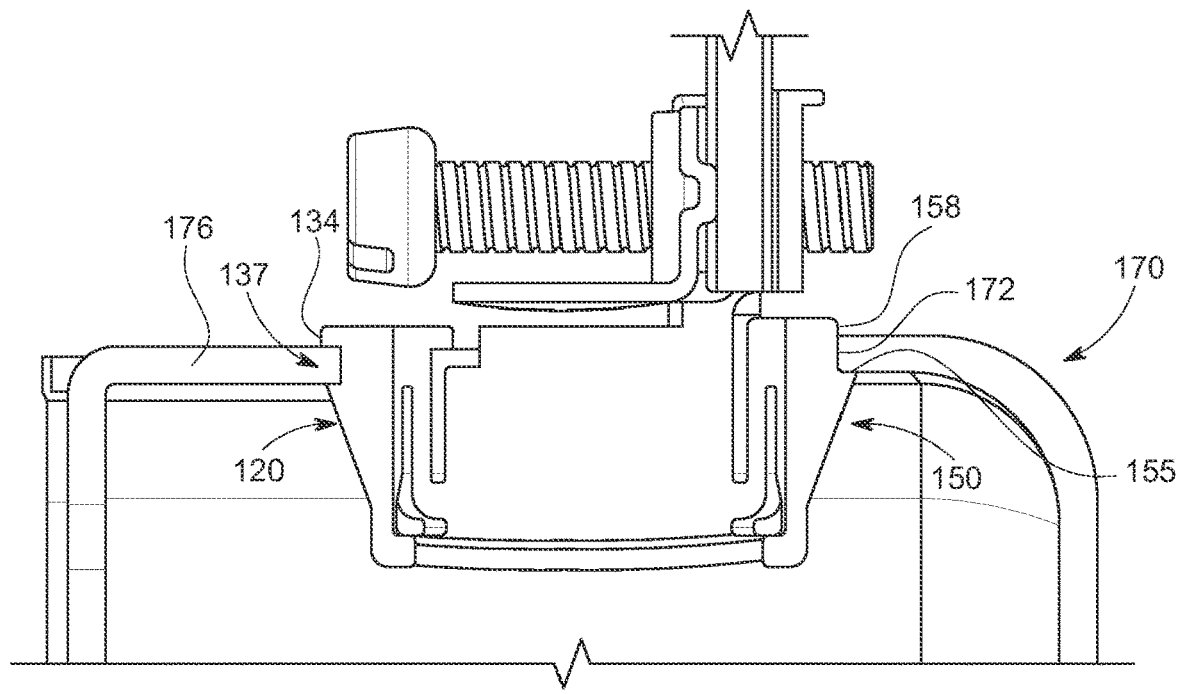
FIG. 11 is a cross-sectional view taken along line C-C of FIG. 10.

Referring to FIG. 7C, the ramped portion 124 ends at a rear ramp wall 125 with a rearward facing surface and which drops to a base portion 128 having a height relative to the axis X that is less than R2. The rear ramp wall can be generally perpendicular to the central axis. Other angles, such as an undercut, are also possible.

As the body 110 is inserted into an aperture 172 in the wall 176 of a junction box 170, the aperture 172 having a radius R3, where R2>R3>R1, a periphery of the aperture 172 will apply force to the ramped portion 124 and cause the tab 120 to flex inwardly. When the body 110 is inserted far enough into the junction box 170 that a back end of the ramped portion 124 has passed through the opening 172 in the wall 176, the first retaining tab 120 snaps back into place. The surface of rear ramp wall 125 operates to will prevent the snapped-in connector 100 from being accidentally withdrawn from the junction box 170.

The base portion 128 extends rearward from the rear ramp wall 125 a distance greater than an expected thickness of the junction box wall 172 so that the base 128 can be accessed from outside of the junction box 170 when the connector is mounted therein and depressed to thereby lower the tab. The specific length the base portion needs to extend from the rear ramp wall depends on the wall thickness of the box the connector is to be used with. Typical electrical boxes are sold with wall thicknesses of about ⅛", although thicknesses can be greater. Solely by way of example, if the connector 100 is configured for use with a box having a wall thickness of ⅛", the base can extend back from the rear ramp wall a length sufficiently greater than ⅛", such as ¼" or 3/16", so the base extends outside of the junction box enough for allow a fingernail or tool, such as slot screwdriver, to gain purchase on the base and apply pressure radially inward.

In a particular embodiment, and with reference to FIGS. 1, 2, 7C, and 8, rear tab wall member 134 can be formed at the back of the base 128 that extends radially outwards and defines a forward facing surface 135. Rear tab wall member 134 has a height greater than R2 so that surface 135 will prevent further advancement of the connector into the junction box. The base 128, surface 135 and surface 125 together define a notch 137 in the first tab 120. A distance between surface 135 and surface 125 is greater than a thickness of the junction box wall 172 so notch 137 which will capture a wall 176 of junction box 170 therein when the connector is fully inserted into the junction box (see FIG. 11). Pressing downward on the rear wall 134 a sufficient amount will deflect the tab 120 inwards to thereby lower surface 125 and disengage the tab 120 from the junction box allowing removal of the connector (assuming other tabs in the connector are also disengaged).

As illustrated in the figures, the rear tab wall member 134 of the first retaining tab 120 can extend circumferentially beyond one or both sides of the notch 137 and define a perpendicular rear flange, such as the arc shaped flange illustrated in the figures, that is coupled to and that moves with the first retaining tab 120. As illustrated in FIG. 7A, the rear flange of the rear member 134 protrudes outwardly from an exterior surface of the junction box 170. The rear member 134 is therefore accessible from the outside of the junction box 170, and can be depressed inwardly (due to a void created by the third gap 140), for example, by a screwdriver tip or finger, toward the central axis X in order to uncouple the notch 137 from the wall 176. This allows a user to uncouple and remove the connector 100 from the junction box 170 without having to access the interior of the junction box. However, the connector 100 can also be removed from an interior of the junction box 170 by depressing the ramped portion 124 inwardly from the interior of the junction box 170.

As will be appreciated, if additional flanges or structures are present on the portion of the assembly 100 that remains outside of the junction box and that are adjacent to and may be contacted by rear wall member 134 when depressed, a sufficient gap should be provided to allow the rear wall member 134, and thereby the tab 120, to be depressed far enough to disengage the tab 120.

Addressing the connection of tab 120 to body 110 more specifically, and as illustrated in FIGS. 2 and 6, the junction 122 and the ramped portion 124 are spaced apart from the first rib 132 by a first gap 136 along a first side of the of the first junction 122 and along a first side of the ramped portion 124. Referring to FIGS. 2 and 6, the first junction 122 and the ramped portion 124 are spaced apart from the first rib 130 by a second gap 138 along a second side of the first junction 122 and along a second side the ramped portion 124. In other words, the first junction 122 and the ramped portion 124 extend between the first and second gaps 136 and 138. Ribs 132, 134 can be "J" shaped, extending towards the tab 120 from the sides of the opening in the body 110 and then turning rearwards. In another embodiment, the ribs can extend generally straightly from the front of opening in the body 110 to the connection with the tab 120. Other configurations for connecting the rib between the body 110 and the tab 120 are also possible. Referring to FIGS. 2 and 6, a third gap 140 separates the second and second ribs 130 and 132, the base 128 and the rear member 134 from the body 110. The first rib 130 extends between the second and third gaps 138 and 140, and the second rib 132 extends between the first and third gaps 136 and 140.

The junction 122 and first, second and second ribs 130 and 132 are elastic so that the first retaining tab 120 can be pressed inwardly toward the central axis X and then snap back into place when the inward force is removed. The length, circumferential width and radial thickness of each of the junction 122 and first and second ribs 130 and 132 can be adjusted to vary the elasticity of the first retaining tab 120, and thereby how easily the first retaining tab 120 can be bent inwardly and outwardly relative to the central axis X. Other ways of elastically attaching the first retaining tab 120 to the main body could be used.

Figure 12:
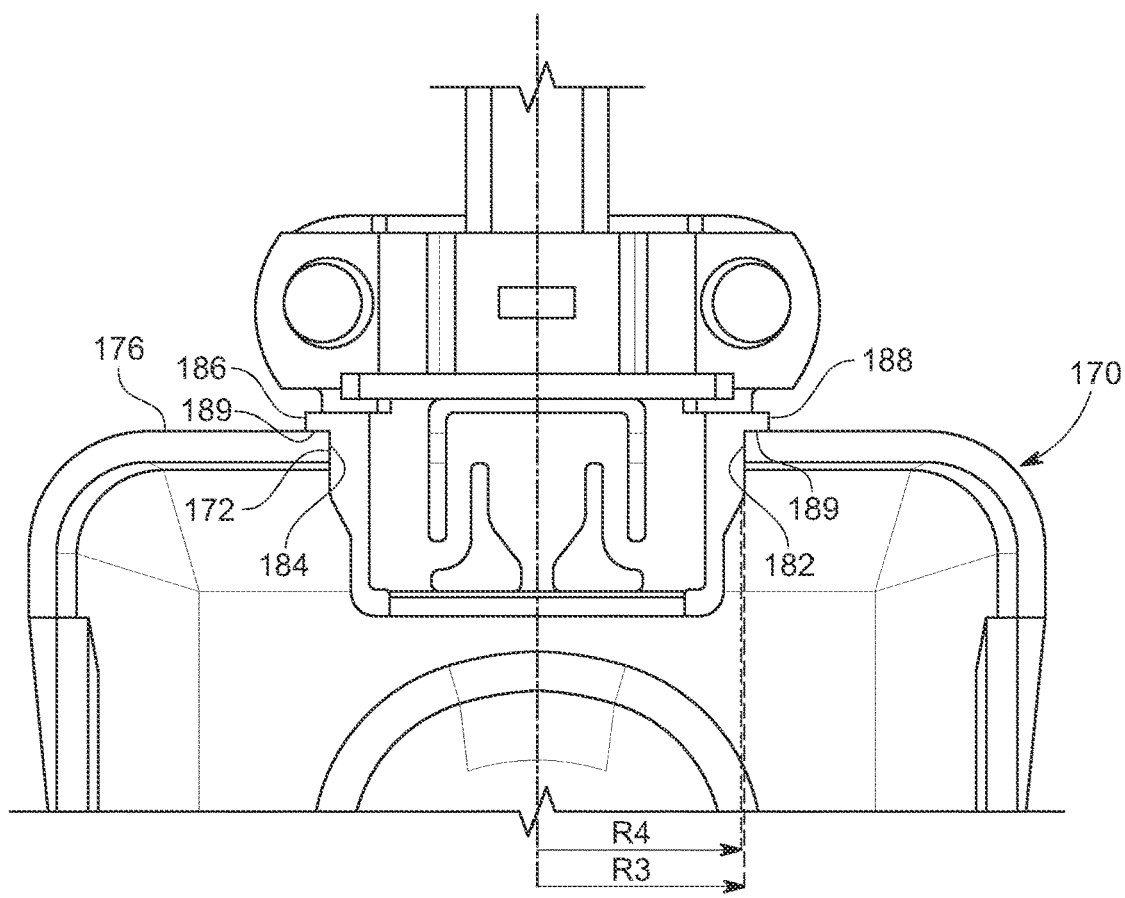
FIG. 12 is a cross-sectional view taken along line D-D of FIG. 10.

As illustrated in FIGS. 1-12, the pair of rear flanges 186 and 188 may extend perpendicularly outwards from the central axis X and may each have at least a forward surface 189 (see FIGS. 7A and 12). The surface 189 of each of the flanges 186 and 188 may be coplanar with the surface 135 of the rear tab wall 134. If neither tab 120 or 150 has a rear member 134 (which has the surface 135), either one of the rear flanges 186 and 188 can operate by itself to prevent the connector 100 from being pushed too far into the junction box 170. In this case, only one of the rear flanges 186 and 188 is needed to prevent the connector 100 from being pushed too far into the junction box 170.

In various embodiments, when a connector of the present invention includes the first retaining tab 120, which in turns has the rear member 134 (with its surface 135), the flanges 186 and 188 may be omitted. When a connector of the present invention includes the first retaining tab 120, the connector may omit the second retaining tab 120 and may omit the rear flanges 186 and 188. In this embodiment, the notch 137 in the first retaining tab 120 alone can be used to couple the connector to a junction box, and the notch 137 can prevent the connector from being pushed too far into the junction box.

Referring to FIGS. 3, 5, 7A, and 8B, the second retaining tab 150 is structurally similar to the first tab 120 but lacks the rear member extending radially outward from the base behind the back of the ramp form a notch that can capture the junction box wall 176. Instead, forward advancement of the connector can be prevented by other flanges around the periphery of the body 110.

Tab 150 is positioned in a respective hole in the body 110 and connected there to by a junction 152 and ribs 160, 162. Ramped portion 154 with inclined surface 156 ends in a rear surface 155 that drops to a base portion 158 having a height relative to the axis X that is less than R2. Base portion 158 extends rearward a distance greater than an expected thickness of the junction box wall 176.

In a particular embodiment, rear flanges 186 and 188 may extend perpendicularly outwards from the central axis X and can be situated on either side of the tab 150. Each has a respective forward surface, such as surface 189 (see FIGS. 7A and 12). Surfaces 189 can operate to prevent the connector 100 from being pushed too far into the junction box 170. While plural flanges 186, 188 are shown, only a single rear flange can operate to prevent the connector 100 from being pushed too far into the junction box 170.

The distance along axis X between the surface 189 of flange 186 or 188 and the rear surface 155 of the tab 150 can be greater than an expected thickness of the junction box wall 176 so that when the connector is inserted, the wall 176 is captured between tab surface 155 and flange surface 189.

In the illustrated embodiment, a single tab 120 and single tab 150 is provided. In various alternative embodiments, a connector assembly 100 can be provided with only a single tab 120, multiple tabs 120, only a single tab 150, multiple tabs 150, or a combination of tabs 120 and tabs 150.

When tabs 120 are provided, the surface 189 of each of the flanges 186 and 188 may be coplanar with the surface 135 of the rear member 134.

As noted, the connector assembly 100 can further include one or more alignment flanges, such as flanges 182, 184. Turning to FIG. 12, the alignment flanges 182 and 184 are ramped and have an outer surface defining a maximum radius or R4 where R3>R4>R1. The alignment flanges 182 and 184 help align the body 110 axially with the aperture 172 and perpendicular with the wall 176 of the junction box. They also can increase friction between the connector and the periphery of the aperture 172 to help reduce unwanted rotation of the connector 100 relative to the box 170.

Once the body is seated in the box, wires can be passed through the body 110 and clamped to the assembly using the clamping mechanism 140. As illustrated in FIG. 1, the clamping component may include a compression plate 142 that can be attached to the connector 100 using screws or bolts 135A, 135B that pass through openings 146A and 146B in the compression plate and into corresponding threaded openings 118A and 118B adjacent the clamping surface 116. The compression plate 142 can include a forward wall to cover a portion of the back 114 of the body 110.

Figure 13:
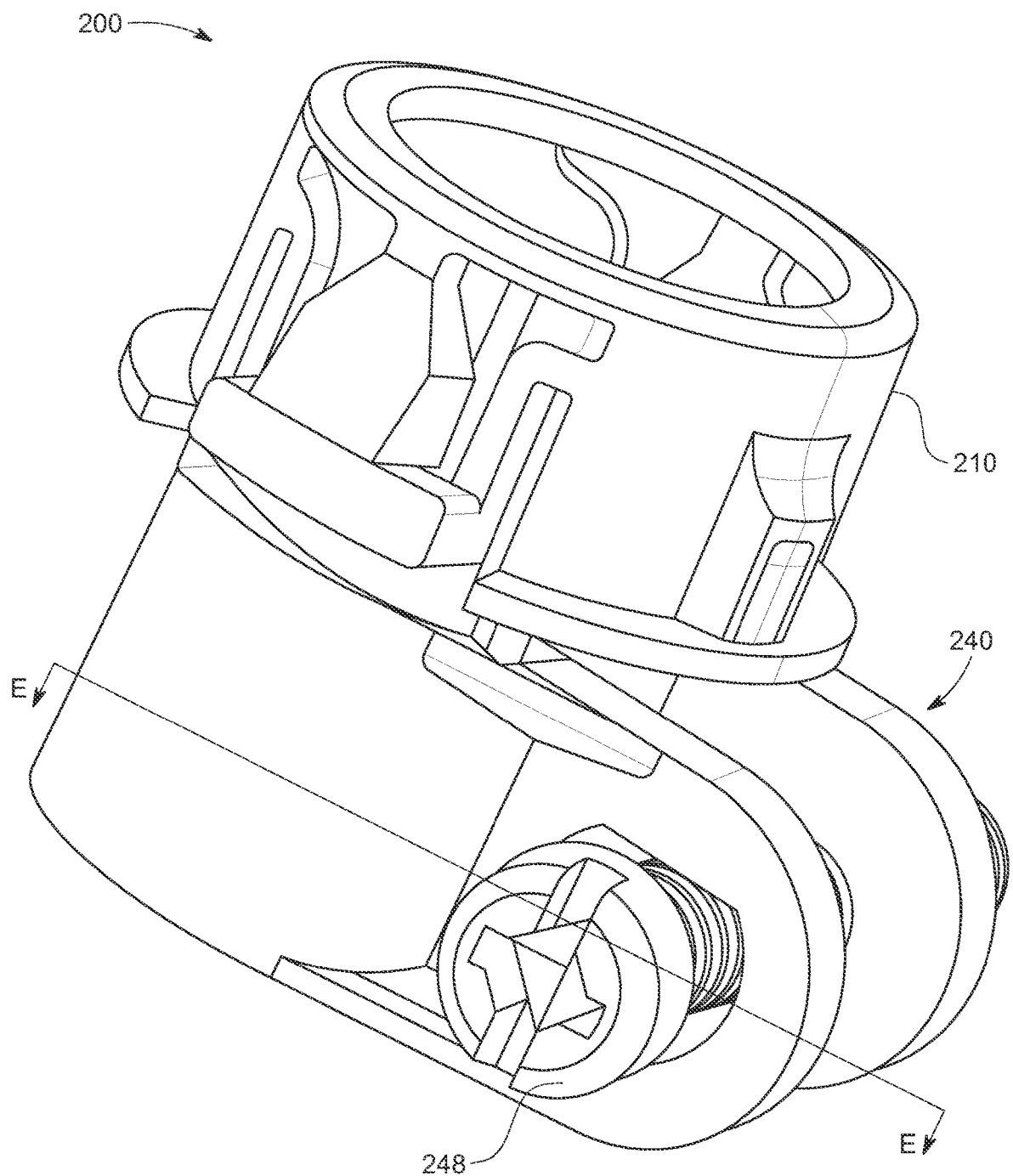
FIG. 13 is a perspective view illustrating a snap-in connector assembly according to an exemplary embodiment of the present invention.
Figure 14:
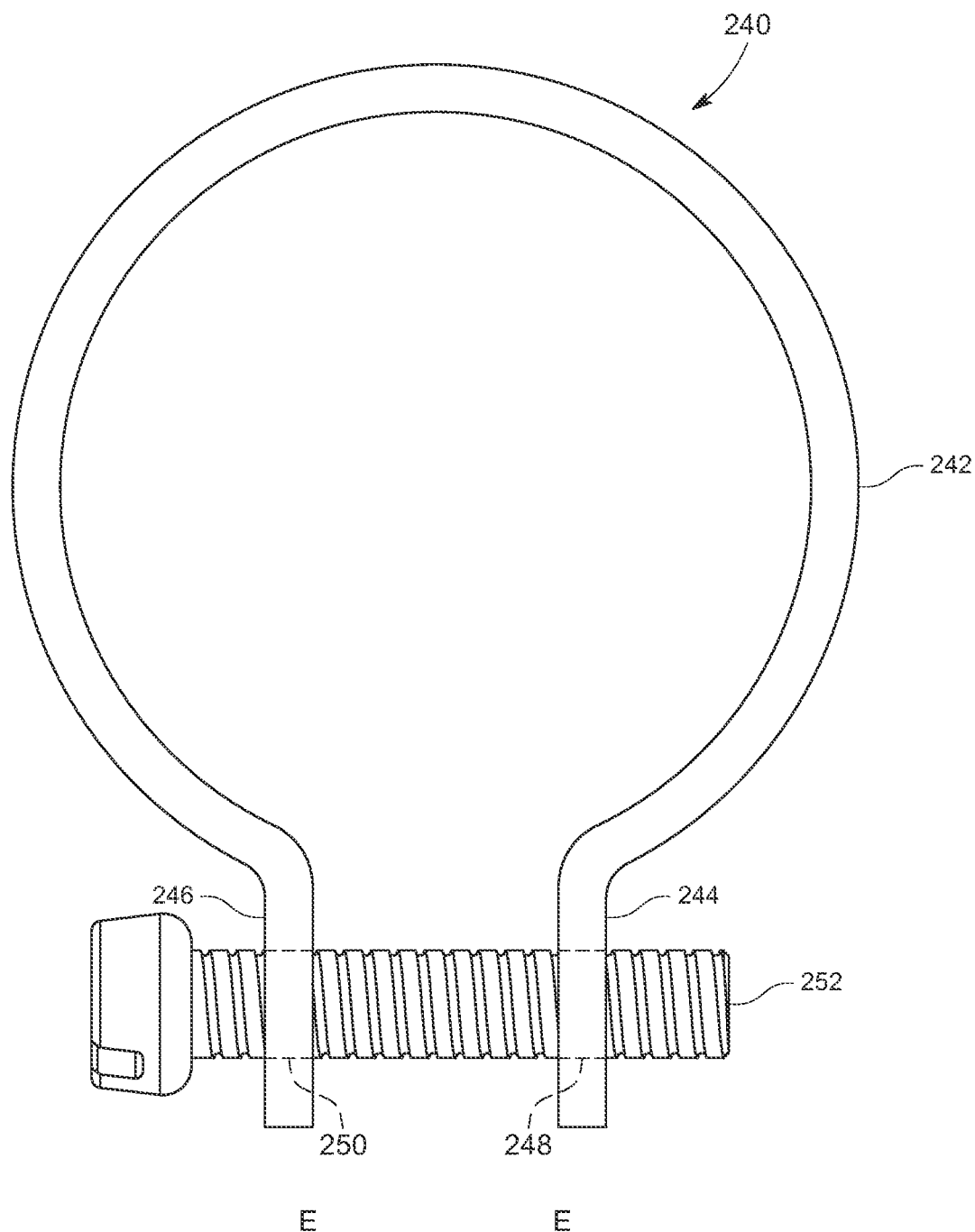
FIG. 14 is a cross-sectional view taken along line E-E of FIG. 13.

Various alternative clamping mechanisms can be provided, FIGS. 13-14 illustrate a snap-in connector assembly 200. The snap-in connector assembly 200 includes a body 210 and a clamp 240 connected to the body 210. The body of body 210 may be identical to that of the connector 100 described above except with a clamp 240 instead of clamping mechanism 140. Referring to FIG. 14, the clamp 240 may have a C-shape. The C-shaped clamp 240 may have an arcuate body 242 and a pair of flanges 244 and 246 extending from opposite ends of the arcuate body 242. The flanges 244 and 246 may face one another. As illustrated in FIG. 14, the flange 244 may have a first opening 248, and the flange 246 may have a second opening 250. The first and second openings 248 and 250 are configured to selectively receive a connector 252 therein in order to tighten or loosen the clamp 240. For example, the connector 252 may be a screw or a bolt threadably engaged to the flanges 244 and 246 which can be used to tighten or loosen the clamp 240 by forcibly moving the flanges 244 and 246 closer to one another or by separating the flanges 244 and 246 from one another.

Figure 15:
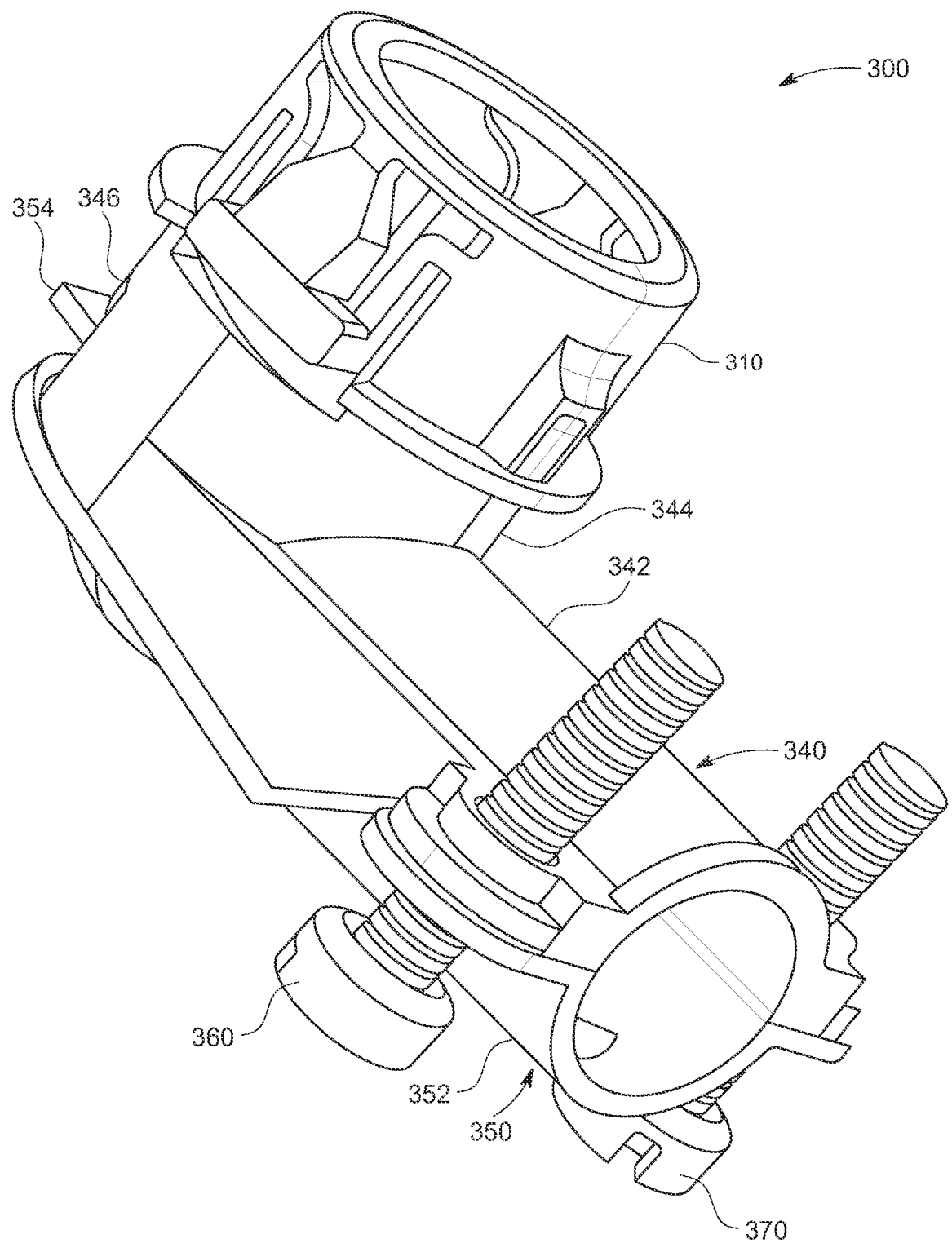
FIG. 15 is a perspective view illustrating a snap-in connector assembly according to an exemplary embodiment of the present invention.
Figure 16:
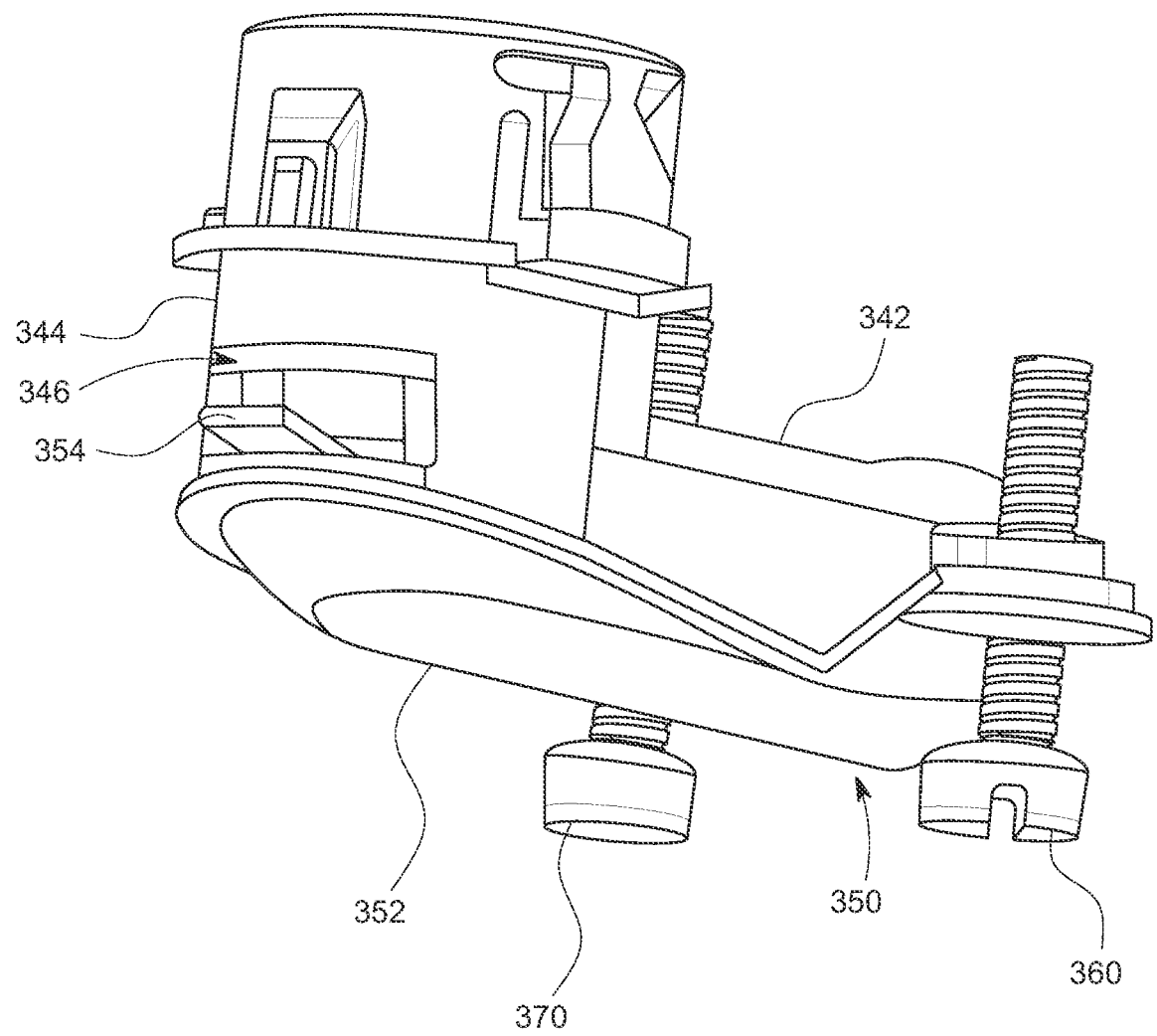
FIG. 16 is a perspective view illustrating the snap-in connector assembly of FIG. 15.
Figure 17:
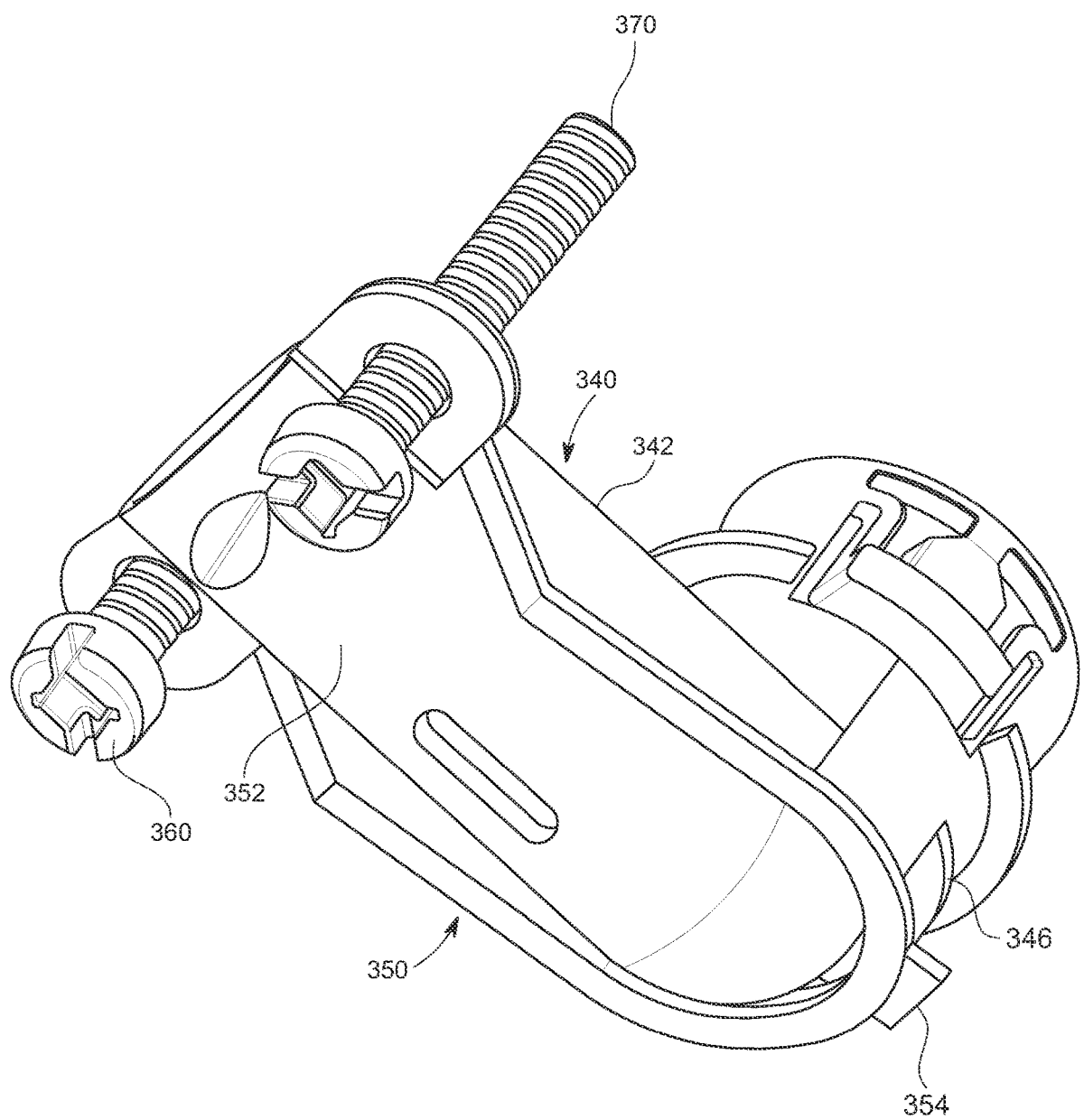
FIG. 17 is a perspective view illustrating the snap-in connector assembly of FIG. 15.

The snap-in connector assemblies illustrated in FIGS. 1-14 are straight, but the present invention is not limited to this configuration. A snap-in connector of the present invention can be configure to retain wires or a conduit at any angle to the central axis X of the body 110, such as at 45 degrees or 90 degrees relative to the central axis X. FIGS. 15-17 illustrate such an example. Referring to FIGS. 15-17, a snap-in connector 300 includes a body 310 and a clamp 340 formed on the end of a bent conduit that is connected to body 310 of connector 300, therethrough, and the conduit has a bend along its length (e.g., in this case a 90 degree bend adjacent to the body 310).

The body 310 may be identical to the connector 100 described above except that the body 310 omits the clamping portion 116, and has a clamp 340 instead. Therefore, only the differences between the body 310 and 100 will be described below.

Referring to FIGS. 15-17, the connector assembly 300 may have a first clamping component 340 connected to the body 310 and a second clamping component 350 selectively connected to the first clamping component 340.

Referring to FIG. 15, the first clamping component 340 has a first portion 342 extending in a first direction (e.g., laterally from the body 310) and a second portion 344 extending in a second direction crossing the first direction (e.g., axially with the body 310).

As illustrated in FIG. 16, the first clamping component 340 has an open region 346, and a lip 354 of the second clamping component 350 extends through the open region 346. This mechanism selectively connects the first and second clamping components 340 and 350 adjacent to the body 310.

A pair of fasteners 360 and 370 can be used to clamp the first and second clamping components 340 and 350 to one another at an end thereof distal to the body 310 (see FIGS. 15-17).

The snap-in connector assemblies described above have a plurality of advantages. For example by selection of appropriate materials, such as a zinc alloy, and changing the physical size and shape of the junction and ribs connecting the tabs to the body of the connector, the elasticity of the tabs can be selected to increase or decrease the amount of force needed to deflect a tab during an insertion and removal process.

The retaining tabs 120 and 150 can be configured to engage with a junction box tightly. Since portions of retaining tabs 120 and 150 are accessible from an outside of a junction box subsequent to the connector 100 being coupled to a junction box, the connector can be easily and selectively removed without having to manipulate the connector from the interior of a junction box. In addition, the alignment flanges 182 and 184 ensure that the connector 100 fits in a center of the opening of a junction box and substantially perpendicular to the wall of the junction box that the connector 100 is coupled to.

While the present invention has been particularly shown and described with reference to exemplary embodiments thereof, it will be apparent to those of ordinary skill in the art that various changes in form and detail may be made therein without departing from the spirit and scope of the present invention as defined by the following claims.

What is claimed is:

1. A connector assembly configured to be mounted to a wall of an electrical box, the connector comprising: a hollow body extending about a central axis, wherein the hollow body has a front open end, a back open end, and a side wall with an outer surface extending between the front and back ends; an opening formed in the side wall; a first retaining tab positioned in the opening and being elastically coupled to the body, the first retaining tab extending from a portion of the hollow body between the front and back ends thereof, wherein a portion of a length of the first retaining tab is separated from the hollow body; and a clamping component extending from the back of the hollow body, the first retaining tab comprising: a ramped portion with a front located proximate to the front of end of the body and extending rearward to a back located proximate the back end of the body and having a rear ramp wall extending downward from the back of the ramped portion; the ramped portion having an incline relative to the central axis such that the back of the ramped portion protrudes radially outwardly from the outer surface of the hollow body by a greater distance relative to the central axis than the front of the ramped portion; and a base extending backwards from the rear ramp wall and having a base length, wherein an upper surface of the base adjacent the rear ramp wall lies closer to the central axis than an upper surface of the ramped portion at the back of the ramped portion, wherein deflection of the base radially inwards reduces the height of the back of the ramped portion relative to the central axis; wherein when the connector assembly is mounted to a box wall through an aperture in the box wall such that the rear ramp wall of the first retaining tab is adjacent an inner surface of the box wall, the rear ramp wall restricts removal of the connector from the aperture, the base length selected so that when the rear ramp wall is adjacent an inner surface of the box wall a portion of the base extends back past an outer surface of the box wall.

2. The connector assembly of claim 1, further comprising a junction extending between the front of the ramped portion of the first tab and the hollow body of the connector and elastically connecting the front of the ramped portion of the first retainer tab to the hollow body.

3. The connector assembly of claim 2, wherein a width of the junction is narrower than a width of the ramped portion of the first retaining tab.

4. The connector assembly of claim 1, further comprising a first rib extending between a first side of the base of the first retainer tab and a first portion of the hollow body of the connector adjacent to the front of the ramped portion of the tab, the first rib elastically connecting the base of the first retaining tab to the hollow body.

5. The connector assembly of claim 4, further comprising a second rib extending between a second side the base of the first retainer tab opposite the first side of the base of the first retainer tab and a second portion of the hollow body of the connector adjacent to the front end of the ramped portion of the first retainer tab, the second rib elastically connecting the base of the first retaining tab and the hollow body to one another, wherein the ramped portion of the first retainer tab extends between the first and second ribs.

6. The connector assembly of claim 1, wherein the connector further comprises a rear flange protruding radially outwardly from the outer surface of the hollow body and having a forward surface that is closer to the back of the body than the rear ramp wall of the first retainer tab; wherein the rear flange is configured to prevent the hollow body of the connector from being pushed beyond a predetermined distance through the aperture in the box wall when the connector is mounted to the box wall.

7. The connector assembly of claim 1, further comprising an alignment flange protruding radially outwardly from the outer surface of the hollow body thereof and being spaced circumferentially from the first retaining tab.

8. The connector assembly of claim 1, the first retainer tab further comprising: a rear tab wall extending radially outwards from the base and spaced back from the rear ramp wall, a forward surface of the rear tab wall, the rear ramp wall, and a surface of the base therebetween forming a notch, wherein when the connector assembly is mounted to the box wall, a portion of the box wall is captured within the notch, the rear tab wall configured to prevent the hollow body from being pushed beyond a predetermined distance through the aperture in the box wall.

9. The connector assembly of claim 8, wherein the rear tab wall extends circumferentially around a portion of the back of the body beyond a width of the first retainer tab.

10. The connector assembly of claim 1, wherein the hollow body of the connector is tubular.

11. A connector assembly configured to be mounted to a wall of an electrical box, the connector assembly comprising:
a hollow body extending about a central axis, wherein the hollow body has a front open end, a back open end, and a side wall with an outer surface extending between the front and back ends;
a plurality of retaining tabs circumferentially spaced around the body and including a first tab and a second tab; and
a clamping component extending from the back of the hollow body,
each respective tab positioned in a respective opening formed in the side wall and being elastically coupled to the body and extending from a portion of the hollow body between the front and back ends thereof, wherein a portion of a length of the respective retaining tab is separated from the hollow body; and
each respective tab comprising:
a ramped portion with a front located proximate to the front of end of the body and extending rearward to a back located proximate the back end of the body and having a rear ramp wall extending downward from the back of the ramped portion, the ramped portion having an incline relative to the central axis such that the back of the ramped portion protrudes radially outwardly from the outer surface of the hollow body by a greater distance relative to the central axis than the front of the ramped portion; and
a base extending backwards from the rear ramp wall and having a base length, wherein an upper surface of the base adjacent the rear ramp wall lies closer to the central axis than an upper surface of the ramped portion at the back of the ramped portion, wherein deflection of the base radially inwards reduces the height of the back of the ramped portion relative to the central axis;
wherein when the connector assembly is mounted to the box wall through an aperture in the box wall such that the rear ramp wall of reach respective tab is adjacent an inner surface of the box wall, the rear ramp wall of each respective tab restricts removal of the connector from the aperture, the base length of each respective tab selected so that when the rear ramp wall of the respective tab is adjacent an inner surface of the box wall a portion of the respective base extends back past an outer surface of the box wall.

12. The connector assembly of claim 11, wherein the first and second tabs are circumferentially opposite to each other.

13. The connector assembly of claim 11, wherein the connector further comprises a plurality of alignment flanges protruding from the outer surface of the hollow body and circumferentially spaced around the body, the alignment flanges being configured to align the hollow body substantially perpendicular to the box wall when the connector is mounted to the box wall.

14. The connector assembly of claim 11, the second tab further comprising a rear tab wall extending radially outwards from the base and spaced back from the rear ramp wall of the second tab, a forward surface of the rear tab wall, the rear ramp wall, and a surface of the base therebetween of the second tab forming a notch, wherein when the connector assembly is mounted to the box wall, a portion of the box wall is captured within the notch, the rear tab wall of the second tab configured to prevent the hollow body from being pushed beyond a predetermined distance through the aperture in the box wall.

15. The connector assembly of claim 14, wherein the rear tab wall of the second tab extends circumferentially around a portion of the back of the body beyond a width of the second tab.

16. The connector assembly of claim 13, further comprising a rear flange protruding radially outwardly from the outer surface of the body adjacent to the back of the body, wherein the rear flange has a forward surface that is substantially coplanar with the forward surface of the rear tab wall of the second tab, and wherein the rear flange is configured to prevent the hollow body of the connector from being pushed beyond a predetermined distance into the aperture of the box wall when the connector assembly is mounted to the box wall.

17. The connector assembly of claim 11, further comprising, for each respective tab,
a junction extending between the front of the ramped portion of the respective tab and the hollow body of the connector and elastically connecting the front of the ramped portion of the respective tab to the hollow body;
a first rib extending between a first side of the base of the respective tab and a respective first portion of the body adjacent to the front of the ramped portion of the respective tab; and
a second rib extending between a second side of the base of the respective tab and a respective second portion of the body adjacent to the front of the ramped portion of the respective tab;
the respective first and second ribs elastically connecting the base of the respective tab to the body.

18. The connector assembly of claim 11, wherein the first and second ribs of the first tab are "J" shaped wherein the stem of the J is connected to the base.

19. The connector assembly of claim 14, wherein the respective opening in the side wall containing the second tab includes a first gap extending along an outer periphery of the rear wall of the second retaining tab, along a first portion of an outer periphery of the first rib of the second retaining tab and along a first portion of an outer periphery of the second rib of the second retaining tab, a second gap extending along a second portion of the outer periphery of the first rib, and a third gap extending along a second portion of the outer periphery of the second rib,
wherein the first rib extends between the first and second gaps, and the second rib extends between the first and third gaps,
wherein the first, second and third gaps together separate the ramped portion and the first and second ribs of the second retaining tab from the hollow body, and
wherein the first, second and third gaps together define a shape of the ramped portion, a shape of the first rib, and a shape of the second rib of the second retaining tab.

20. The connector assembly of claim 11, wherein the respective opening containing the first tab includes first and second gaps respectively extending along opposite sides of the ramped portion of the first tab in a length direction of the ramped portion, the first and second gaps separating the ramped portion of the first tab from the body.

21. The snap-in connector of claim 20, wherein the respective opening containing the first tab further includes a third gap extending along an outer periphery of a rear portion of the base of the first tab, along an outer periphery of the first rib of the first tab, and along an outer periphery of the second rib of the first tab.

* * * * *